(No Model.)

A. ABRAHAM.
NOSE PIECE FOR EYEGLASSES.

No. 543,835. Patented Aug. 6, 1895.

WITNESSES:
F. Norman Dixon
Thos. K. Lancaster.

Albert Abraham
INVENTOR

By his Attorneys,
Wm C. Strawbridge
J Bonsall Taylor

UNITED STATES PATENT OFFICE.

ALBERT ABRAHAM, OF PHILADELPHIA, PENNSYLVANIA.

NOSE-PIECE FOR EYEGLASSES.

SPECIFICATION forming part of Letters Patent No. 543,835, dated August 6, 1895.

Application filed June 18, 1894. Serial No. 514,842. (No model.)

*To all whom it may concern:*

Be it known that I, ALBERT ABRAHAM, a citizen of the United States, residing in the city and county of Philadelphia, in the State of Pennsylvania, have invented an Improvement in Nose-Pieces for Eyeglasses or Spectacles, of which the following is a specification.

It is the object of my invention to provide a nose-piece which shall be adapted to bear very firmly and closely upon the nose of the wearer, of a light, neat, and sightly appearance, of a simple and inexpensive construction, and capable of being easily and readily set, as to the portion which bears upon the nose of the wearer, in any desired position of adjustment, either in the plane of the lenses or offset and out of said plane.

In the accompanying drawings I show and herein I describe a good form of a convenient embodiment of my invention, the particular subject-matter claimed as novel being hereinafter definitely specified.

Figure 1:
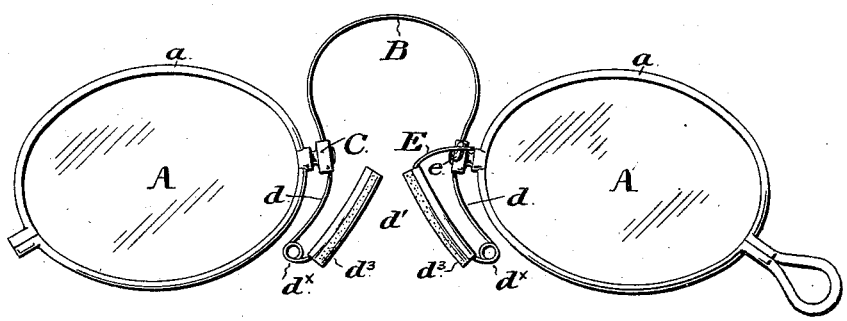
Figure 2:
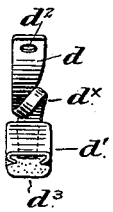
Figure 3:
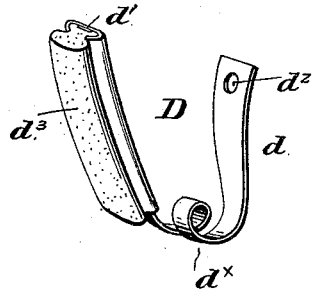
Figure 4:
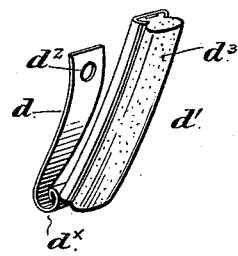

In the accompanying drawings, Figure 1 is a view in elevation of a pair of glasses equipped with my improved nose-pieces. Fig. 2 is a top plan view of the improved nose-piece shown as bent into position and in readiness to be applied to the glasses. The adjustment or arrangement shown in this figure is that resorted to when it is desired to have the nose-piece in the plane of the lenses. Fig. 3 is a view in perspective of my improved nose-piece shown as so conformed as to carry the contact-arm of the nose-piece out of the plane of the lenses of the eyeglass to which said nose-piece may be applied. Fig. 4 is a view in perspective, of my improved nose-piece, shown as so conformed that its contact-arm will exist in the plane of the lenses of the eyeglasses to which said nose-piece may be applied.

Similar letters of reference indicate corresponding parts.

In the drawings, A A are the lenses, $a$ $a$ the rims or frames of said lenses, C C the clamp-posts, and B the bow-spring, of a pair of eyeglasses of conventional construction. (Illustrated in Fig. 1.)

My improved nose-piece, as shown applied to the glasses illustrated in Fig. 1 and as shown in detail in the other figures of the drawings, consists broadly of a small fillet or bar of preferably resilient metal, adapted as to one extremity for attachment to a clamp-post or other portion of the eyeglass structure, adapted as to its other extremital portion to bear upon the nose of the wearer, and intermediate of its length bent upon itself to form a spiral coil.

In the preferred form of my invention shown in the drawings the bar or fillet of preferably resilient metal, designated D, is bent to a U form, and the spiral coil, which it, as stated, embodies, is formed at the bight or loop at the lower portion of the structure.

One arm of the U-shaped nose-piece intended for attachment to the clamp-post or lens-frame I term the "supporting-arm" $d$. The other arm, intended to present against the nose of the wearer, I term the "contact arm" $d'$, and the coil itself I designate $d^{\times}$.

The upper extremity of the supporting-arm is in Figs. 2, 3, and 4 shown as provided with an aperture $d^2$, through which a screw or rivet passes to secure the nose-piece to the clamp-post, and when so secured the supporting-arm depends from said clamp-post in approximately the same plane as the lenses. The contact-arm $d'$ is to be provided with a facing $d^3$ of any preferred material, such as celluloid, cork, rubber, or any substance adapted to take a frictional hold upon the nose. Said facing $d^3$ may be applied and attached to the contact-arm $d'$ by resort to any of the methods well known in the art by which facings are attached to nose-pieces.

The coil $d^{\times}$, into which the supporting and contact arms merge, may be of any desired radius and pitch.

When it is desired that the contact-arm shall exist in the plane of the lenses, as in Figs. 2 and 4, the central portion of the nose-piece, if the latter is made from a flat band or fillet as opposed to being made of wire, may, if desired, be somewhat narrowed to allow freedom of movement of the metal of the coil in the use of the glasses and to prevent the edge of the bar or fillet having undue lateral projection.

As will be apparent, the formation of the coil in the metal of the nose-piece naturally operates to carry the contact-arm out of the plane of the lenses and to thus offset the said contact-arm, so that in use said arm may make contact with the nose of the wearer at such selected point as the optician fitting the glass may determine, and the structure thus possesses all the advantages incident to the well-known class of offset nose-pieces.

As will be understood, by simply expanding or contracting the coil axially the degree of projection or offset of the contact-arm may be varied and regulated at will.

If desired, the upper end of the contact-arms or nose-rests proper may be secured to the clamp-post or other portion of the frame of the lenses in such manner as will leave them free to be moved toward and away from each other, but will confine them against undue movement. This may be accomplished by resort to the well-known arrangement illustrated in connection with the right-hand nose-piece in Fig. 1, in which E is a tongue secured to and extending rearwardly away from said nose-piece and embodying a longitudinal slot, in which is engaged a stud $e$, suitably mounted upon the frame of the lens.

Having thus described my invention, I claim and desire to secure by Letters Patent—

An eyeglass or spectacle provided with nose-pieces extensible in planes perpendicular to the plane of the lenses, each of which consists of a strip of metal, one end of which is connected to the frame, the other end of which carries a piece of facing material for contact with the nose of the wearer, and the intermediate portion of which is bent to form a coil the axis of which is perpendicular to the plane of the lenses, substantially as set forth.

In testimony that I claim the foregoing as my invention I have hereunto signed my name this 13th day of June, A. D. 1894.

ALBERT ABRAHAM.

In presence of—
J. BONSALL TAYLOR,
F. NORMAN DIXON.